(12) United States Patent  (10) Patent No.: US 8,534,596 B2
Lauder  (45) Date of Patent: Sep. 17, 2013

(54) PLANETARY DE-ROTATION SYSTEM FOR A SHAFT FAIRING SYSTEM

(75) Inventor: Timothy Fred Lauder, Oxford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 304 days.

(21) Appl. No.: 12/810,186

(22) PCT Filed: Jan. 2, 2008

(86) PCT No.: PCT/US2008/050010
§ 371 (c)(1),
(2), (4) Date: Jun. 23, 2010

(87) PCT Pub. No.: WO2009/088491
PCT Pub. Date: Jul. 16, 2009

(65) Prior Publication Data
US 2010/0270423 A1    Oct. 28, 2010

(51) Int. Cl.
*B64C 27/00* (2006.01)
(52) U.S. Cl.
USPC ............... 244/17.19; 244/17.23; 416/129
(58) Field of Classification Search
USPC ............. 244/17.23, 17.11, 17.16, 17.19, 60, 244/12.2; 416/128, 129
See application file for complete search history.

(56) References Cited

U.S. PATENT DOCUMENTS

| | | | |
|---|---|---|---|
| 2,323,786 A | 7/1943 | Beisel | |
| 2,328,786 A | 9/1943 | Crowder | |
| 2,397,632 A | 4/1946 | Stuart | |
| 3,149,803 A | 9/1964 | Petrides et al. | |
| 3,894,703 A | 7/1975 | Velasquez | |
| 4,022,546 A | 5/1977 | Drees et al. | |
| 4,053,258 A | 10/1977 | Mouille | |
| 4,123,018 A | 10/1978 | Tassin de Montaigu | |
| 4,212,588 A | 7/1980 | Fradenburgh | |
| 4,447,023 A * | 5/1984 | Reid | 244/17.11 |
| 4,478,379 A | 10/1984 | Kerr | |
| 4,566,856 A | 1/1986 | Miller | |
| 4,580,944 A | 4/1986 | Miller | |
| 4,809,931 A | 3/1989 | Mouille et al. | |
| 5,152,668 A * | 10/1992 | Bulman et al. | 416/129 |
| 5,251,847 A | 10/1993 | Guimbal | |
| 5,289,994 A | 3/1994 | Del Campo Aguilera | |
| 5,364,230 A | 11/1994 | Krauss et al. | |
| 5,415,364 A | 5/1995 | Grant | |
| 5,588,618 A | 12/1996 | Marze et al. | |
| 5,727,754 A | 3/1998 | Carter, Jr. | |
| 5,885,059 A | 3/1999 | Kovalsky et al. | |
| 5,954,480 A | 9/1999 | Schmaling et al. | |
| 7,083,142 B2 | 8/2006 | Scott | |
| 7,229,251 B2 | 6/2007 | Bertolotti et al. | |
| 7,270,520 B2 | 9/2007 | Sudre et al. | |

(Continued)

OTHER PUBLICATIONS

Title: Summary of Rotor Hub Drag Data; by: G.N. Keys and H.J. Rosenstein; Dated: Mar. 1978.

(Continued)

*Primary Examiner* — Timothy D Collins
*Assistant Examiner* — Brian M O'Hara
(74) *Attorney, Agent, or Firm* — Carlson, Gaskey & Olds

(57) ABSTRACT

A de-rotation system includes a planetary gear set, and a fairing support structure mounted for rotation with a first ring gear.

16 Claims, 5 Drawing Sheets

(56) References Cited

U.S. PATENT DOCUMENTS

| | | | |
|---|---|---|---|
| 7,607,607 B2 * | 10/2009 | Darrow et al. | 244/17.19 |
| 2005/0067527 A1 | 3/2005 | Petersen | |
| 2007/0166163 A1 | 7/2007 | Bertolotti et al. | |
| 2007/0181741 A1 | 8/2007 | Darrow, Jr. et al. | |

OTHER PUBLICATIONS

Title: Experimental Investigation of Advanced Hub and Pylon Fairing Configurations to Reduce Helicopter Drag; by: D.M. Martin, R.W. Mort, L.A. Young, P.K. Squires; Dated: Sep. 1993, NASA Technical Memorandum 4540.
Title: The First 50 Years Were Fine . . . But What Should We Do for an Encore?—The 1994 Alexander A. Nikolsky Lecture; by: Evan A. Fradenburgh; Journal of the American Helicopter Society; Jan. 1995.
Title: Rotorcraft Hub Shroud; by: LTC Chip Lunn; Brannon Industries; Apr. 11, 2006.
Search Report and Written Opinion mailed on Jun. 27, 2008 for PCT/US2008/50010.
International Preliminary Report on Patentability mailed on Mar. 18, 2010 for PCT/US2008/50010.

* cited by examiner

PLANETARY DE-ROTATION SYSTEM FOR A SHAFT FAIRING SYSTEM

BACKGROUND

The present invention is directed to a de-rotation system for a shaft fairing mounted between an upper hub fairing and a lower hub fairing.

The aerodynamic drag associated with a rotor hub of a rotary-wing aircraft is a significant portion of the overall aircraft drag, typically 25 percent to 30 percent for conventional single-rotor helicopters. The rotor system drag increases for a rotary-wing aircraft having a counter-rotating, coaxial rotor system primarily due to the dual rotor hubs and the interconnecting main rotor shaft assembly. For high-speed rotary wing aircraft, the increased drag resulting from the counter-rotating, coaxial rotor system may result in a relatively significant power penalty.

The aerodynamic drag of the dual counter-rotating, coaxial rotor system is generated by three main components—the upper rotor hub assembly, the lower rotor hub assembly, and the interconnecting main rotor shaft assembly. The drag contribution may be approximately 40 percent for each of the hubs, and 20 percent for the interconnecting main rotor shaft assembly. Typically, a rotor hub fairing arrangement is mounted to each of the upper rotor hub and the lower rotor hub such that overall drag on the rotorcraft is reduced. The interconnecting main rotor shaft between the upper rotor hub assembly and the lower rotor hub assembly, however, is typically exposed.

For a variety of reasons including, but not limited to, reduced drag and low observability, a shaft fairing has been developed to streamline the exposed interconnecting main rotor shaft. The shaft fairing is mounted to the counter-rotating, coaxial rotor system within a rotational environment between the upper hub fairing and the lower hub fairing through a bearing arrangement such that the shaft fairing is aligned with the fuselage in forward flight but is free to align with the relative wind during low speed maneuvering.

During some flight conditions, the shaft fairing may undesirably rotate relative the airframe. Rotation of the shaft fairing may increase drag and reduce the low-observability benefits of the shaft fairing.

SUMMARY

A de-rotation system for a fairing system according to an exemplary aspect of the present invention includes a first ring gear defined about an axis, a second ring gear defined about the axis, a planetary gear set in meshing engagement with the first ring gear and the second ring gear, a cage assembly which supports the planetary gear set, and a fairing support structure mounted for rotation with the first ring gear.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF EXEMPLARY EMBODIMENTS

Figure 1A:
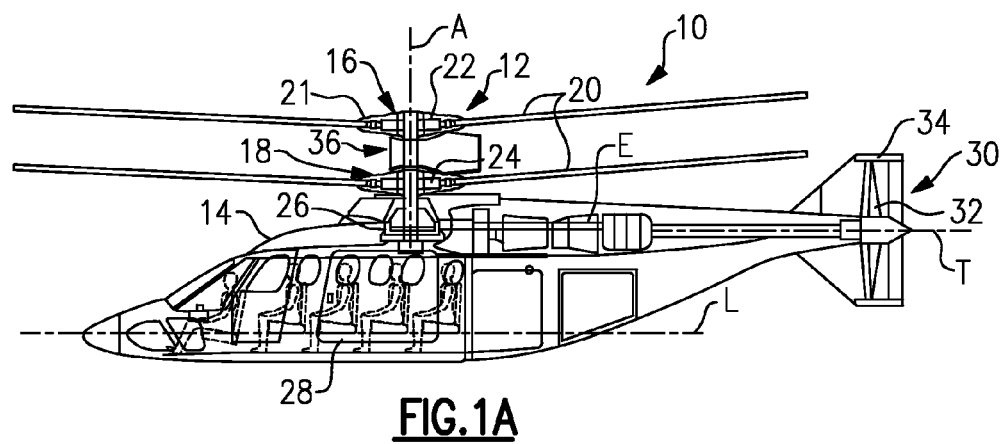
FIG. 1A is a general schematic view of an exemplary rotary wing aircraft embodiment for use with exemplary embodiments of the present invention.

FIG. 1A illustrates an exemplary vertical takeoff and landing (VTOL) rotary-wing aircraft 10 having a dual, counter-rotating, coaxial rotor system 12 which rotates about an axis of rotation A. The aircraft 10 includes an airframe 14 which supports the dual, counter rotating, coaxial rotor system 12 as well as an optional translational thrust system 30 which provides translational thrust generally parallel to an aircraft longitudinal axis L. Although a particular aircraft configuration is illustrated in this non-limiting embodiment, other counter-rotating, coaxial rotor systems will also benefit from the present invention.

The dual, counter-rotating, coaxial rotor system 12 includes an upper rotor system 16 and a lower rotor system 18. Each rotor system 16, 18 includes a plurality of rotor blades 20 mounted to a rotor hub 22, 24 for rotation about a rotor axis of rotation A. A plurality of the main rotor blades 20 project substantially radially outward from the hub assemblies 22, 24. Any number of blades 20 may be used with the rotor system 12.

A main gearbox 26 which may be located above the aircraft cabin 28 drives the rotor system 12. The translational thrust system 30 may be driven by the same main gearbox 26 which drives the rotor system 12. The main gearbox 26 is driven by one or more engines (illustrated schematically at E). The gearbox 26 may be interposed between the gas turbine engines E, the rotor system 12 and the translational thrust system 30.

The translational thrust system 30 may be mounted to the rear of the airframe 14 with a rotational axis T oriented substantially horizontal and parallel to the aircraft longitudinal axis L to provide thrust for high-speed flight. The translational thrust system 30 includes a pusher propeller 32 mounted within an aerodynamic cowling 34. Although a tail mounted translational thrust system 30 is disclosed in this illustrated non-limiting embodiment, it should be understood that any such system or other translational thrust systems including tractor and pod mounted systems may alternatively or additionally be utilized.

The rotor system 12 includes a rotor hub fairing system 36 generally located between and around the upper and lower rotor systems 16, 18 such that the rotor hubs 22, 24 are at least partially contained therein. The rotor hub fairing system 36 provides significant drag reduction in which large-scale flow separation is greatly reduced.

Figure 1B:
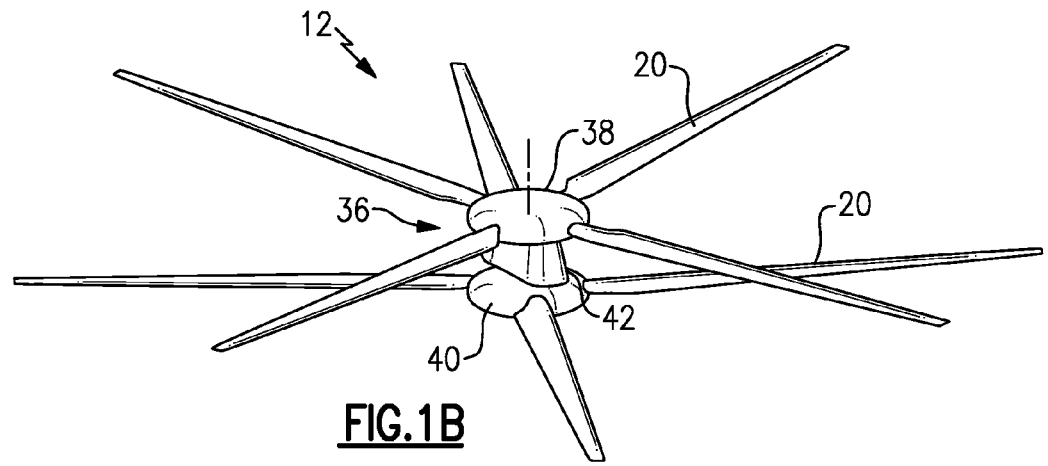
FIG. 1B is a general perspective of a counter-rotating coaxial rotor system mounting a rotor hub fairing system.

The rotor hub fairing system 36 generally includes an upper hub fairing 38, a lower hub fairing 40 and a shaft fairing 42 therebetween (also illustrated in FIG. 1B). The rotor hub fairing system 36 is integrated such that the shaft fairing 42 generally follows the contours of the upper hub fairing 38 and the lower hub fairing 40 at the rotational interfaces therebetween to reduce interference effects between the separate fairings 38, 40, 42 and minimize flow separation in the junction areas. Furthermore, the lower hub fairing 40 is integrated with the airframe 14 in an area typically referred to on a rotorcraft as a pylon 14D (see FIG. 1C). It should be understood that fairing systems of various configurations will be usable with the exemplary embodiments of the present invention presented herein.

Figure 1C:
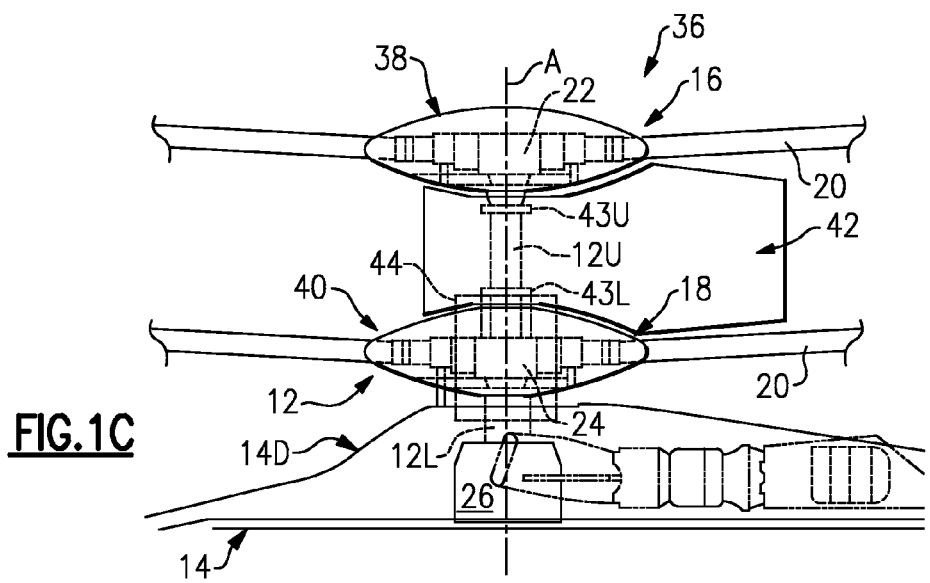
FIG. 1C is an expanded partial phantom view of a counter-rotating coaxial rotor system mounting a rotor hub fairing system according to an exemplary embodiment of the present invention.

Referring to FIG. 1C, the shaft fairing 42 may be mounted to the counter-rotating, coaxial rotor system 12 through a bearing arrangement 43U, 43L (illustrated schematically) such that the shaft fairing 42 may be positioned at a relative angular position about the axis of rotation A relative the airframe 14 by a de-rotation system 44. The upper bearing arrangement 43U and the lower bearing arrangement 43L may be respectively located adjacent an upper portion and a lower portion of the shaft fairing 42. The upper bearing arrangement 43U may be attached to one rotor shaft 12U while the lower bearing arrangement 43L attached to the other rotor shaft 12L such that bearings in the arrangements 43U, 43L are counter rotating and the net bearing drag is relatively low.

The de-rotation system 44 controls the position of the shaft fairing 42 about the axis of rotation A such that the shaft fairing 42 remains in a desired azimuthal position relative the airframe 14. Although exemplary embodiments of the present invention are described in connection with a particular non-limiting aircraft embodiment, it should be readily appreciated that other systems which require a stationary fairing in a rotational environment will also benefit herefrom.

Figure 2A:
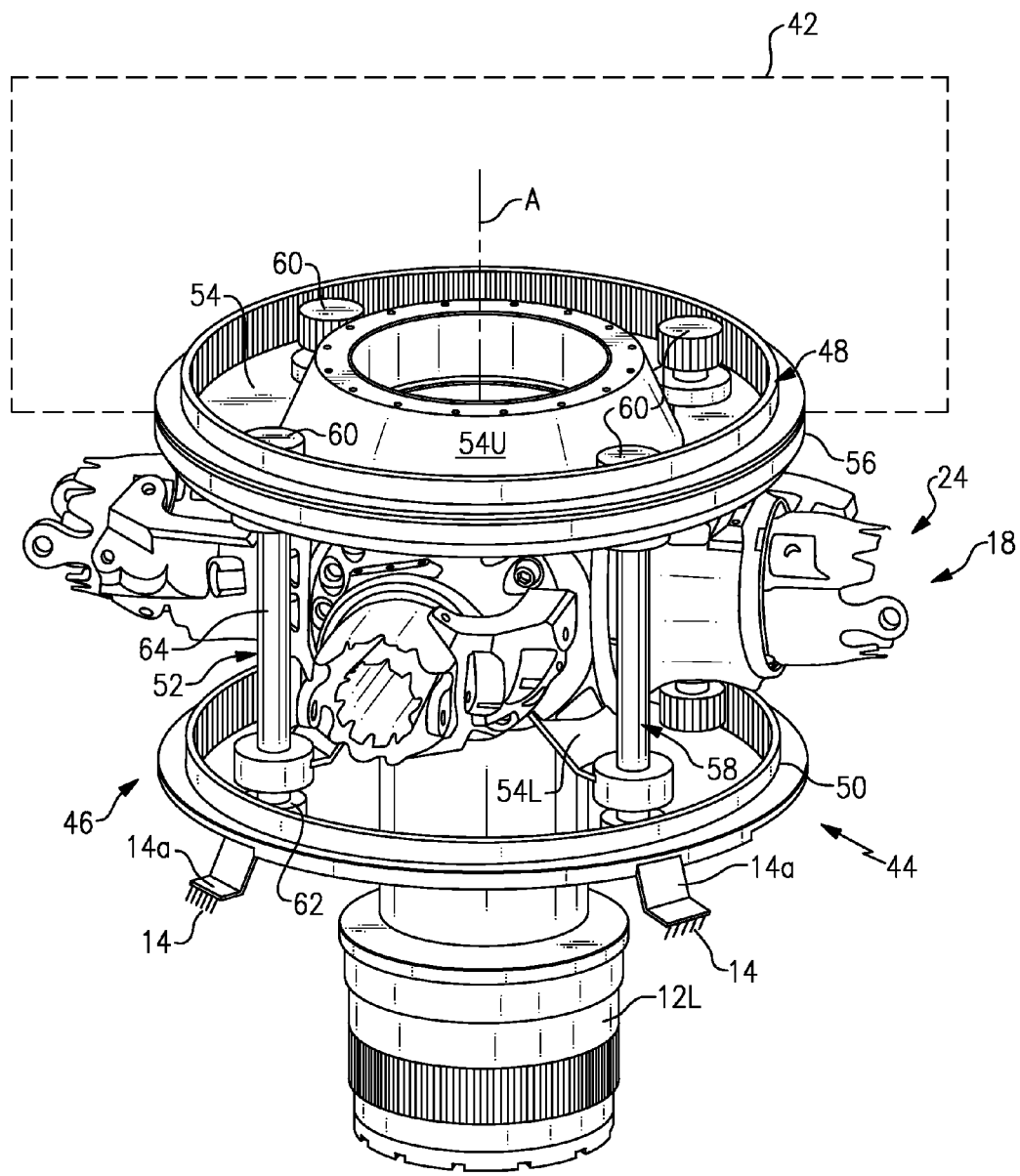
FIG. 2A is a perspective view of a counter-rotating coaxial rotor system illustrating a de-rotation system.

Referring to FIG. 2A, the de-rotation system 44 generally includes a planetary gear system 46 to control a rotational position of the shaft fairing 42 (see e.g., FIG. 1C). The planetary gear system 46 generally includes a first ring gear 48, a second ring gear 50, a planetary gear set 52 a cage assembly 54 and a fairing support structure 56.

The second ring gear 50 is rotationally fixed to the airframe 14 though attachments 14A or such like. The first ring gear 48 is mounted to the inter-rotor fairing support structure 56 which is mounted to the shaft fairing 42.

Figure 2B:
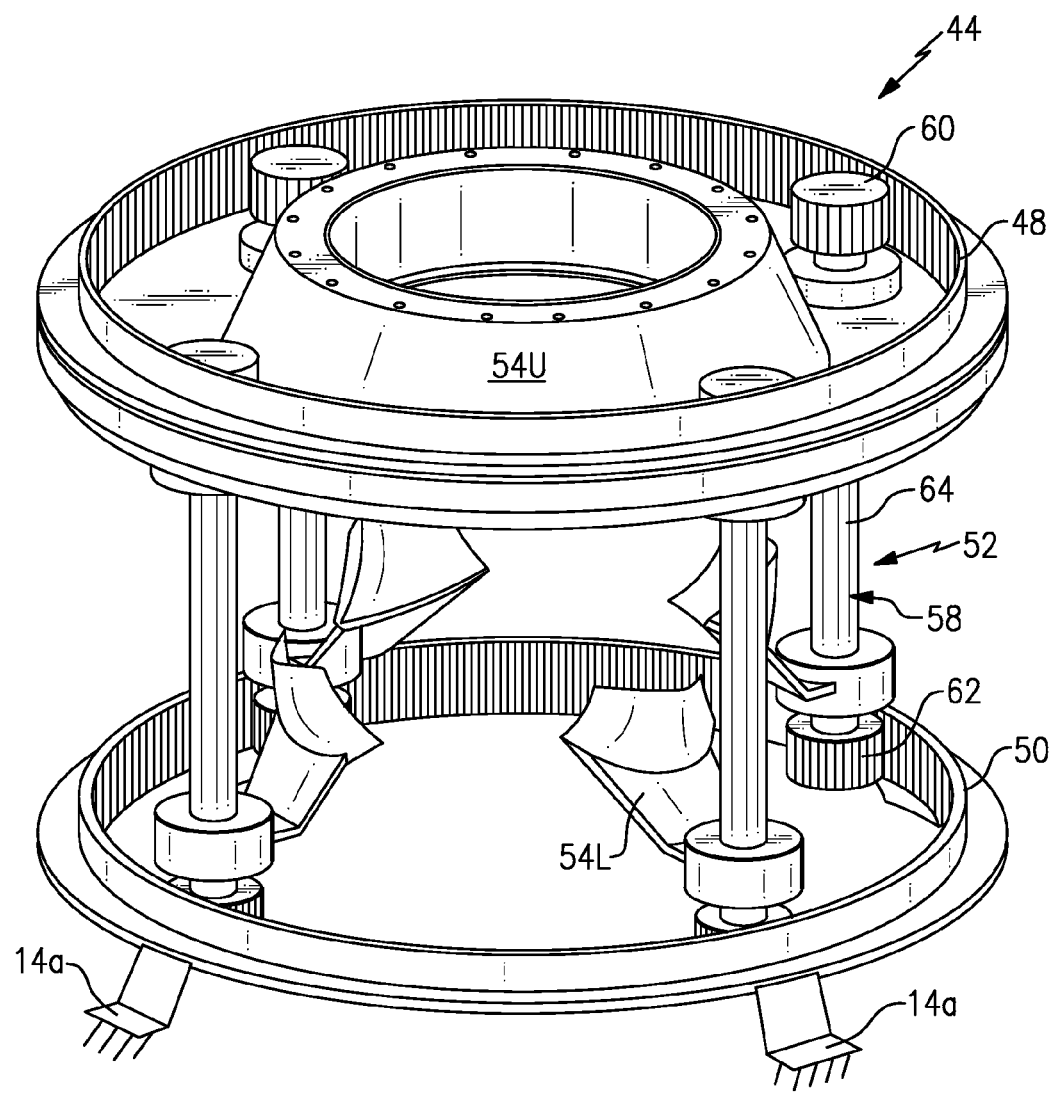
FIG. 2B is an expanded perspective view of the de-rotation system illustrated in FIG. 2A.

The planetary gear system 46 generally includes a multitude of planet gear assemblies 58. Each planet gear assembly 58 includes an upper planet gear 60, a lower planet gear 62 and an interconnect shaft 64 that rotationally connects the upper planet gear 60 and the lower planet gear 62. The upper planet gear 60 is in meshing engagement with the inner diameter of the first ring gear 48 and the lower planet gear 62 is in meshing engagement with the inner diameter of the second ring gear 50. Although four planet gear assemblies 58 are illustrated in the non-limiting embodiment shown in FIGS. 2A and 2B, it should be understood that other numbers of assemblies may alternatively be provided—typically one planet gear assembly 58 would be located between each pair of main rotor blades.

The multitude of planet gear assemblies 58 are supported by the cage assembly 54. The cage assembly 54 includes an upper interface 54U and lower interface 54L (also illustrated in FIG. 2B) which support the planetary gear set 52. The upper interface 54U and the lower interface 54L are mounted to the main rotor system 12 for rotation therewith. The upper interface 54U may be mounted to the lower bearing 43L or other rotational support. That is, the upper interface 54U is axially retrieved and rotationally supported by the lower bearing 43L.

Figure 3A:
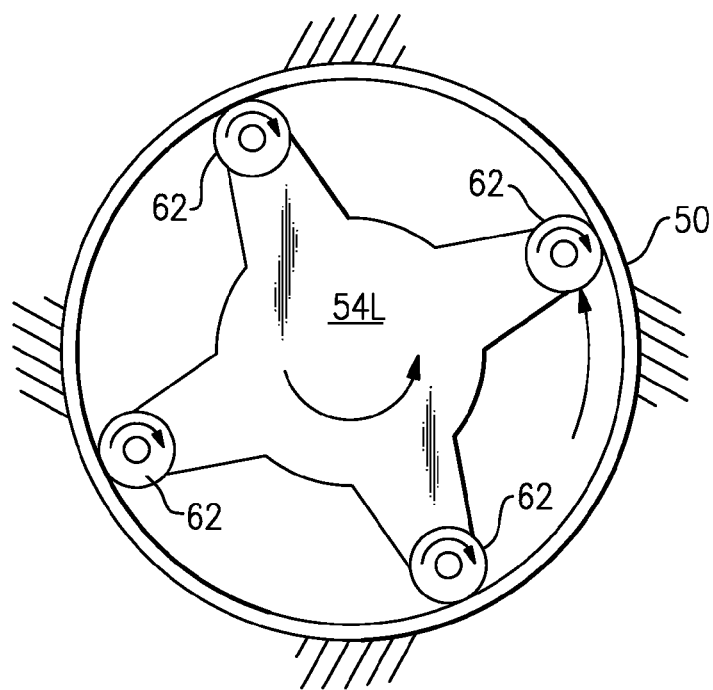
FIG. 3A is a top schematic view of a lower ring gear of an exemplary de-rotation system.
Figure 3B:
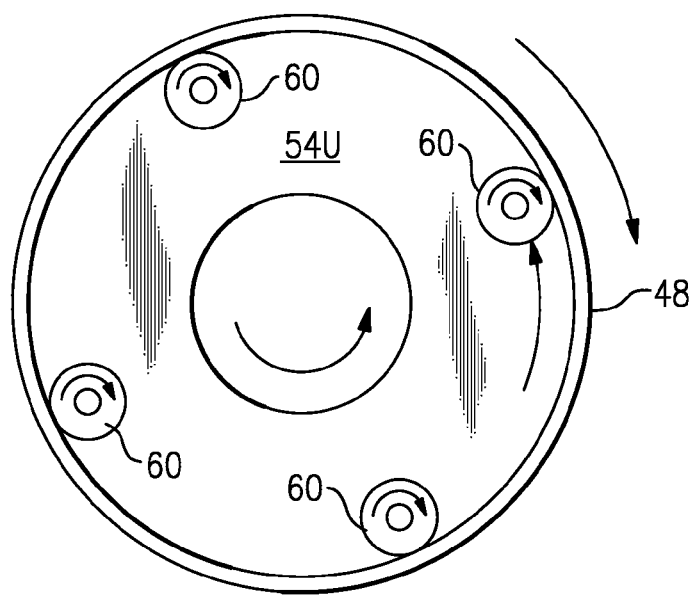
FIG. 3B is a top schematic view of an upper ring gear of the de-rotation system of FIG. 3A.

In operation, with reference to FIG. 3A, as the cage assembly 54 is rotated by the main rotor system 12, the lower planet gears 62 react with the fixed second ring gear 50 to rotate each planet gear assembly 58 about each of their respective planet axes P. The upper planet gear 60 of each planet gear assembly 58 is thereby rotated by the interconnect shaft 64. The upper planet gear 60 rotates the first ring gear 48 in an equal but opposite direction of the cage assembly 54 (FIG. 3B). Rotation of the first ring gear 48 rotates the inter-rotor fairing support structure 56 to rotate the shaft fairing 42 such that the shaft fairing 42 maintains a stable azimuthal position relative the airframe 14. That is, the first ring gear 48 and the attached shaft fairing 43 appear stationary to the fixed airframe 14

The de-rotation system 44 is a passive system that derives mechanical input from the main rotor system 12. The power required is minimal as friction is the only opposing force and gear meshes are noted as efficient power transfer mechanisms. Since the fixed and rotating ring gears are rigidly connected via a gear and shaft arrangement, the de-rotation system 44 will maintain alignment, regardless of main rotor RPM variations.

Figure 4:
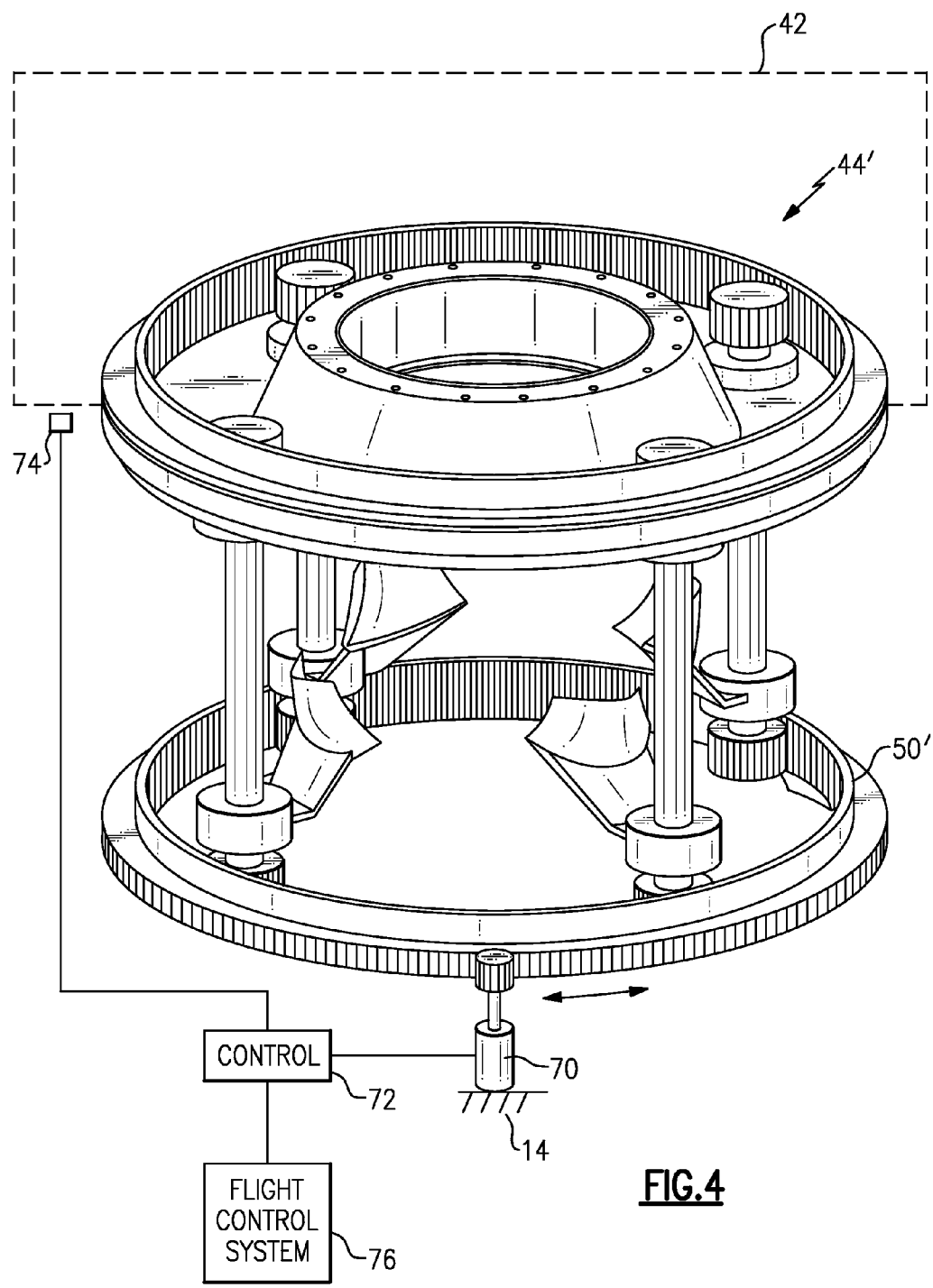
FIG. 4 is a perspective view of another exemplary de-rotation system with an active control.

Referring to FIG. 4, another de-rotation system 44' provides an active, in-flight adjustable position capability. That is, the second ring gear 50' is azimuthally positionable relative the airframe 14. A drive system 70 controls the rotational position of a second ring gear 50' relative the airframe 14 (FIG. 1C) in response to a control system 72. The control system 72 may be in communication with a shaft fairing position sensor 74 and a flight control system 76 to azimuthally position the second ring gear 50' and thus the shaft fairing 42 relative the airframe 14 throughout all flight regimes to, for example, actively align the shaft fairing 42 with prevailing wind conditions during particular flight regimes.

It should be understood that relative positional terms such as "forward," "aft," "upper," "lower," "above," "below," and the like are with reference to an illustrated attitude of the structure and should not be considered otherwise limiting.

Although particular step sequences are shown, described, and claimed, it should be understood that steps may be performed in any order, separated or combined unless otherwise indicated and will still benefit from the exemplary embodiments of the present invention.

The foregoing description is exemplary rather than defined by the subject matter within. Many modifications and variations of the present invention are possible in light of the above teachings. Although certain embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A de-rotation system comprising:
   a first ring gear defined about an axis;
   a second ring gear defined about said axis;
   a planetary gear set in meshing engagement with said first ring gear and said second ring gear;
   a cage assembly which supports said planetary gear set; and
   a shaft fairing mounted for rotation with said first ring gear to control a position of said shaft fairing about said axis of rotation, wherein said shaft fairing is located between a rotor hub and at least one of the first ring gear and the second ring gear.

2. The system as recited in claim 1, wherein said second ring gear is fixed relative to said axis.

3. The system as recited in claim 1, wherein said planetary gear set is in meshing engagement with an inner diameter of said first ring gear and an inner diameter of said second ring gear.

4. The system as recited in claim 1, wherein said planetary gear set comprises a multitude of planet gear assemblies.

5. The system as recited in claim 4, wherein each of said multitude of planet gear assemblies comprise an upper planet gear, a lower planet gear and a shaft that rotationally connects said upper planet gear and said lower planet gear.

6. The system as recited in claim 1, further comprising a drive system which selectively rotates said second ring gear.

7. The system as recited in claim 6, further comprising a control system in communication with said drive system to selectively rotate said second ring gear to azimuthally position said second ring gear in response to a flight control system.

8. The system as recited in claim 1, wherein the shaft fairing is configured to reduce aerodynamic drag.

9. The system as recited in claim 1, wherein the shaft fairing has a non-circular cross section.

10. The system as recited in claim 1, wherein the shaft fairing has an elliptical cross section.

11. The system as recited in claim 1, wherein the de-rotation system is configured to surround a rotor shaft on a rotary winged aircraft.

12. The system as recited in claim 1, including an upper hub fairing defined about said axis.

13. The system as recited in claim 12, including a lower hub fairing defined about said axis.

14. The system as recited in claim 13, wherein the shaft fairing is mounted for relative rotation between the upper hub fairing and the lower hub fairing.

15. The system as recited in claim 13, wherein the shaft fairing is located between the upper hub fairing and the lower hub fairing.

16. The system as recited in claim 1, wherein the shaft fairing is configured to be exposed to an airflow.

* * * * *